United States Patent
Hogen et al.

[11] Patent Number: 5,543,049
[45] Date of Patent: Aug. 6, 1996

[54] MICROBIAL MEDIATED WATER TREATMENT

[75] Inventors: Delman R. Hogen, 7813 Madison St., Spring Lake Park, Minn. 55432; James R. Robin, Excelsior, Minn.

[73] Assignee: Delman R. Hogen, Spring Lake Park, Minn.

[21] Appl. No.: 356,879

[22] Filed: Dec. 15, 1994

Related U.S. Application Data

[63] Continuation-in-part of Ser. No. 650,059, Feb. 4, 1991, abandoned.

[51] Int. Cl.⁶ .................................................. C02F 3/34
[52] U.S. Cl. .......................... 210/601; 210/631; 210/716; 210/717; 210/906
[58] Field of Search ............................ 210/601, 631, 210/716, 716, 906

[56] References Cited

U.S. PATENT DOCUMENTS

| | | |
|---|---|---|
| 3,388,060 | 6/1968 | Clark . |
| 3,423,309 | 1/1969 | Albertson . |
| 3,480,144 | 11/1969 | Barth et al. . |
| 3,522,173 | 7/1970 | Lindman et al. . |
| 3,617,569 | 11/1971 | Daniels et al. . |
| 3,655,552 | 4/1972 | Flock, Jr. et al. . |
| 3,730,882 | 5/1973 | Levin et al. . |
| 4,008,169 | 2/1977 | McGauley . |
| 4,029,575 | 6/1977 | Bykowski et al. . |
| 4,108,771 | 8/1978 | Weiss . |
| 4,202,864 | 5/1980 | Spevack . |
| 4,267,058 | 5/1981 | Kyri et al. . |
| 4,331,538 | 5/1982 | Kickuth ................................. 210/631 |
| 4,354,937 | 10/1982 | Hallberg ................................. 210/717 |
| 4,416,779 | 11/1983 | Ripl et al. . |
| 4,431,543 | 2/1984 | Matsuo et al. . |
| 4,476,027 | 10/1984 | Fox . |
| 4,507,206 | 3/1985 | Hughes . |
| 4,566,975 | 1/1986 | Allgulin . |
| 4,695,384 | 9/1987 | Ripl et al. . |
| 4,717,558 | 1/1988 | Beck et al. . |
| 4,789,478 | 12/1988 | Revis et al. . |
| 4,995,969 | 2/1991 | LaVigne . |
| 5,098,567 | 3/1992 | Nishiguchi . |
| 5,120,160 | 6/1992 | Schwengel . |
| 5,178,491 | 1/1993 | Graves et al. . |
| 5,230,586 | 7/1993 | Bachhausen et al. . |

FOREIGN PATENT DOCUMENTS

| | | | |
|---|---|---|---|
| 1161485 | 6/1985 | U.S.S.R. ................................. | 210/601 |

OTHER PUBLICATIONS

Article entitled "*Aquatic Nutrient Binding Process*", dated 9 Mar. 1992, by Clear Water Technolgies, Inc.

Article entitled "*Minnesota Memoir A Lifetime of Lakes*", by William Albert Allard, *National Geographic*, vol. 182, No. 3, dated Sep. 1992, pp. 92–119.

*Primary Examiner*—Neil McCarthy
*Attorney, Agent, or Firm*—Vidas Arrett & Steinkraus

[57] ABSTRACT

Generation of $Fe^{+2}$ for water treatment and treatment process using a microbe capable of converting $Fe^{+3}$ to $Fe^{+2}$ wherein the microbe is selected from ATCC 55339.

5 Claims, 1 Drawing Sheet

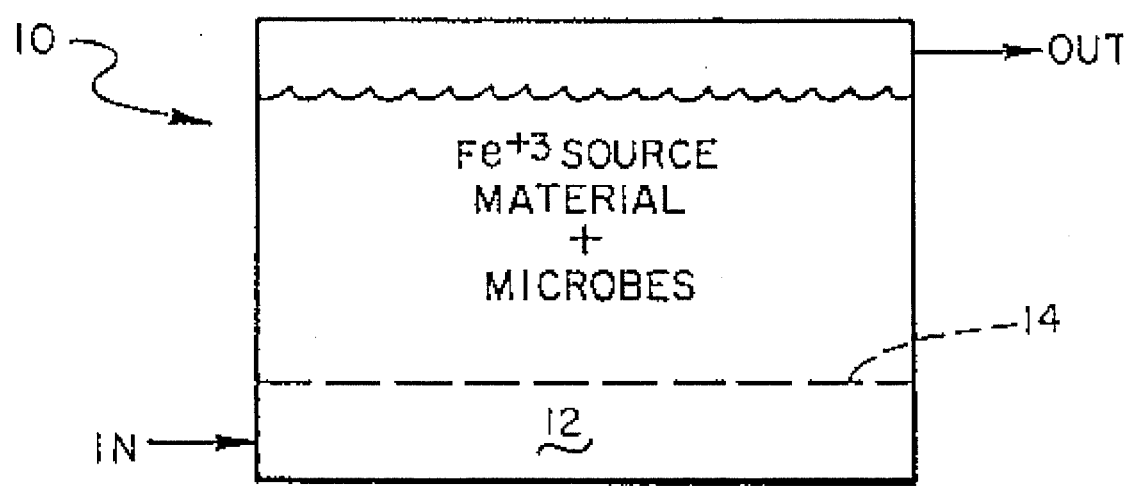

MICROBIAL MEDIATED WATER TREATMENT

BACKGROUND OF THE INVENTION

This invention is a continuation-in-part of MICROBIAL MEDIATED METHOD FOR SOIL AND WATER TREATMENT, Ser. No. PCT/US93/106,455, filed Jul. 8, 1993, by the same inventors, designating the United States of America which is a Continuation-In-Part of METHOD OF CONTROLLING SULFUR AND PHOSPHORUS IN AQUEOUS SYSTEMS, Ser. No. 07/650,059, filed Feb. 4, 1991, by the same inventors, and now abandoned. In that application, microbes (example ATCC 55339) and iron are used to treat water for decreasing sulfur, phosphorus and various other undesired contents. The entire content of that application is incorporated herein by reference.

SUMMARY OF THE INVENTION

According to the present invention, large quantities of soluble iron ($Fe^{+2}$) are rapidly formed by a microbial mediated technique in an aqueous macro or micro anaerobic environment. The $Fe^{+2}$ may be subsequently used for water treatment, specifically to suppress heavy metals, sulfur and sulfide in aerobic water and to bind and precipitate excess environmentally damaging phosphorus in oxygenated aqueous environments such as industrial waste water, lakes, ponds, rivers, streams, waste water treatment ponds, sewage, food processing ponds, fish farms and the unsaturated soils adjacent to septic trenches, as the $Fe^{+2}$ changes state to $Fe^{+3}$.

BRIEF DESCRIPTION OF THE DRAWING FIGURE

The sole FIGURE shows in schematic an anaerobic chamber for generating $Fe^{+2}$ according to this invention.

DETAILED DESCRIPTION OF THE PREFERRED EMBODIMENTS

This invention is based on and utilizes subject matter described in the aforementioned previously filed patent application. According to one preferred form of the present invention, a flow-through chamber, such as 10 in the FIGURE, which contains a quantity of $Fe^{+3}$ source material (iron oxide in the form of iron ore concentrate, dust or iron ore pellets, $Fe_2O_3$ or $Fe_3O_4$, taconite and/or magnetite, the latter being most preferred) and a consortium of microbes which utilize $Fe^{+3}$ as a terminal electron acceptor to degrade waste water hydrocarbons as they respire and replicate, is used to provide $Fe^{+2}$ for treatment of municipal waste water sewage. Chamber 10 is constructed and arranged to maintain anaerobic conditions within itself i.e., it should be sealed except for its inlet and outlet. Chamber 10 may also be constructed other than as shown, i.e., it may be arranged for flow through percolation, up-flow or lateral flow, and so forth.

The FIGURE shows chamber 10 designed for up-flow, including an inlet indicated by arrow, a lower manifold area 12, a support grating, screen or the like 14, for the media comprised of $Fe^{+3}$ source material such as taconite and/or magnetite and the microbe consortium, an upper collection chamber area 16 leading to the outlet and an outlet indicated by another arrow.

Such chambers will vary in size depending on the treatment desired. For example, in the case of a municipal waste water treatment plant, chambers of concrete many feet high—15 feet or greater containing 6000 cubic feet of iron oxide substrate and capable of passing 1% of the cities raw sewage therethrough i.e., thousands of gallons per minute of waste water, may be used to generate the desired soluble $Fe^{+2}$ from the $Fe^{+3}$ source material for subsequently treating the balance of the municipal sewage. Multiple sets of chambers may be used. For example, in tentative planning for proposal is a typical small city system which will make use of three 20×20×15 feet concrete bunkers as chambers, each containing about 1100 tons of taconite pellets. Since the 5% to 6% reduction in the matrix volume per year will have little effect on the operating ability of the system, it should only need to be opened about every 10 years for matrix replacement. Each chamber contains 6000 cubic feet of iron oxide matrix but since the matrix is composed of spherical components, i.e., iron ore pellets, it only occupies slightly more than two thirds of the total volume. This leaves about 2000 cubic feet or about 15000 gallons of open channels through the iron oxide matrix. For a 24 hour retention the flow becomes approximately 10 gallons per minute (gpm) through the system for each chamber. The total flow through all three chambers is 30 gpm. This is about 1% of the maximum daily flow from the city which is about 3000 gpm or 4,320,000 gallons per day.

The anaerobic chamber is inoculated with the appropriate microbe as discussed above e.g., ATCC 55339, the amount will vary depending on chamber size and the start up time desired. For example, a chamber of the size above might be inoculated with about 100% of the working volume in the first chamber. The amount of inoculus initially provided is not critical since it is a living entity. The inoculum will come to full operating strength in three to four days of internal recirculation, given nutrient. After the first chamber is at operating level, waste water becomes the influent and the effluent of the first chamber at, approximately twenty percent of the total flow, becomes the influent to the other two chambers which will then be recirculated until they reach full operating strength. At this point the system is placed in parallel operation to treat any required percentage of entire influent to the waste pond.

This system could also be used to operate the anaerobic cells of aerobic/anaerobic series treatment where it would have the added advantage of reducing the available effluent phosphorus and sulfur by effluent precipitation.

Once the iron material and microbe are present in the chamber, only nutrient need be added to initiate the generation of soluble $Fe^{+2}$. Nutrient may be supplied by the waste water and sewage, which mainly includes a suitable carbon source such as carbohydrates including sugars, amino acids and micronutrients (minor amounts of heavy metals which are typically present in enzymatic quantities, parts per billion or parts per trillion, such as Mo, Co and sometimes Va). They tend to be used up in the waste stream flow but can be readily identified as to where they are best available in the system flow to be most readily collected and circulated to a treatment chamber.

Sewage and the like is passed into chamber 10 via inlet 12. With adjustment of flow rate to allow for reduction of $Fe^{+3} \rightarrow Fe^{+2}$, the aqueous output containing $Fe^{+2}$ at outlet 14 of chamber 10 may then be used to treat the main body of the sewage to effectively suppress the solubilization of heavy metals, bind sulfur as sulfide, and when introduced to oxygenated waters oxidizes to $Fe^{+3}$ (such as an open system) bind and precipitate phosphorus.

A chamber as described above could be activated and placed in or near a body of water to be treated. Solar or mechanical pumping could be used to move water through the system for dispersion to the water body. In its broadest sense, a pond or the like could be used as a chamber equivalent.

When the waste water to be treated does not contain the necessary nutrients, they can be added to the media of $Fe^{+3}$ source material and microbes in the chamber. For example, to treat industrial waste water such as the effluent of a plating operation containing gold, silver, nickel, copper or hydrogen sulfide (such as is found in waste water from an egg breaking facility preparing prepackaged eggs), a prepackaged media including a mixture of magnetite, microbes, amino acids (such as casine digest amino acids from cow stomachs, available in stockyards) and micronutrients and a suitable source of carbon (carbohydrates such as sugar) if needed may be placed in the chamber. The carbon source may act as a binder for the mixture. Molasses is a desirable binder and carbon source. The relative amounts may vary widely and will be determined by the amount of $Fe^{+2}$ desired to be generated. The dominant component in amount will be the iron source. Actual relative amounts in any specific instance can be determined by monitoring the amounts of $Fe^{+2}$ produced and altering as described.

EXAMPLES OF $Fe^{+2}$ PREPARATION

Sediment samples were collected with an Ekman Grab Sampler from hypolimnetic region of Lake Martha near Rockford, Minn. as part of a winter examination of experimental treatment plots on the take. It was not expected that any significant amount of the desired microbe would be present.

The next day, six each 250 cc samples of sediment from Lake Martha were inoculated with 1 cc of thawed ATCC 55339 and duplicates of 250 cc of water from the Boyceville, Wis. secondary treatment pond, and 250 cc of water from Turtle Lake, Wis. The samples were mixed and placed in 500 cc glass incubation bottles, capped with septums and allowed to incubate in a New Brunswick Scientific oscillating shaker bath for a month.

The samples were then sampled with a syringe and assayed for $Fe^{+2}$ with a Perkin Elmer AA spectrophotometer. The iron concentrations ranged from 5.9 to 6.3 mg/l which is a typical activation level for inoculated lake sediments.

Subsamples (already containing microbes) of 5 ml each were reinoculated into 50 ml of Lake Martha sediment and 50 ml of lake water to make 105 ml sample; to this, 10 milligrams per liter of casine digest was added. Casine digest contains amino acids which have been hydrolyzed from protein. Carbohydrates and some amino acids are naturally available in the sediment. At the first sampling the pH of the four containers had been rebuffered by the microbial metabolites and by-products to between pH 5.92 to 6.17. The samples remained in this pH range throughout the remaining test set. Samples were extracted with syringes and analyzed for soluble $Fe^{+2}$ with a surprising result. The $Fe^{30\ 2}$ had increased from 6.3 mg/l to 46.6, 87.8, 145.9 and 45.1 mg/l respectively. The 145.9 was an increase of 23 X. The second set which was analyzed after 41 hours was 346, 385, 404, and 331 mg/l respectively and the pH of the solutions as sampled ranged from 5.92 to 6.17. The second increase was 7.4 X, 4.4 X, 2.8 X and 7.3 X. Clearly the organisms had run out of nutrients before the second sample set and had increased the iron in the solution by 64 X.

Thus, it can be seen that large amounts of $Fe^{+2}$ are readily generated in this manner.

EXAMPLE OF TREATMENT WITH $Fe^{+2}$

The sample containing the 404 mg/l iron concentration was used to titrate a set of 11 waste water samples from the Boyceville, Wis. set. Although the iron is $Fe^{+2}$ as titrated, it is quickly oxidized to $Fe^{+3}$ in the oxygenated water. The iron is ionically bound to the phosphorus and the combined salt precipitates. The resulting data is shown in the Table below.

| Phosphorus vs. titrated iron as $Fe^{+2}$ | | |
|---|---|---|
| Activated Concentrate ml | Iron mg/l as $Fe^{+2}$ | Phosphorus as T[P] mg/l |
| 0 | 0 | 5.02 |
| 1 | 0.404 | 4.71 |
| 2 | 0.808 | 4.82 |
| 3 | 1.12 | 4.81 |
| 4 | 1.62 | 4.63 |
| 5 | 2.02 | 4.29 |
| 6 | 2.42 | 3.74 |
| 7 | 2.83 | 3.27 |
| 8 | 3.23 | 2.56 |
| 9 | 3.64 | 2.11 |
| 10 | 4.04 | 1.73 |

As already indicated, this invention quickly and continuously, if desired, generates high concentrations of $Fe^{+2}$ which may then be used in turn to suppress the solubilization of heavy metals, bind sulfur as sulfide and, when introduced to oxygenated waters, bind and precipitate phosphorus. It has the added advantage of generating small readily oxidized organic acid anions such as acetates, which are degradation by-products or metabolites. These acetates then buffer the media and support the ferrous iron in high concentrations in solution. Because these anions are readily degradable by aerobic microbes there is no need to support the iron ions with environmentally deleterious anions such as chloride or sulfate. The chlorides and sulfates are used in much higher concentrations and have detremented effects of re-releasing the phosphorus they bind.

This invention allows one to generate high concentrations of soluble iron on short notice and retain it under anaerobic conditions and in solution until needed. It is conceivable that the ions could be generated at one site, transferred to another site for subsequent treatment of water for phosphorus or sulfur reduction. All of this is possible without the use of algicides and herbicides.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. The method of generating soluble $Fe^{+2}$ comprising the steps:

providing a source of $Fe^{+3}$, a quantity of at least one microbe capable of converting $Fe^{+3}$ to $Fe^{+2}$, which is selected from ATCC 55339, and an aqueous solution of nutrient in a container;

allowing the conversion of $Fe^{+3}$ to $Fe^{+2}$ to occur, forming soluble $Fe^{+2}$ in water; and thereafter removing the soluble $Fe^{+2}$ and water from the container, and using the soluble $Fe^{+2}$ in a process for treating water.

2. The method of claim 1 wherein the water to be treated is aerobic.

3. The method of claim 1 wherein the water to be treated is anaerobic.

4. The method of claim 1 wherein the soluble $Fe^{+2}$ removed from the container is held for later use.

5. The method of treating a body of water comprising:

providing a container including inlet and outlet means and containing $Fe^{+3}$ and at least one microbe selected from ATCC 55339, which reduces $Fe^{+3}$ to $Fe^{+2}$, allowing the conversion of $Fe^{+3}$ and $Fe^{+2}$ to occur, and sinking the container in the body of water, allowing it to remain for an extended period of time, thereby treating said water with said $Fe^{+2}$.

* * * * *

UNITED STATES PATENT AND TRADEMARK OFFICE
CERTIFICATE OF CORRECTION

PATENT NO. : 5,543,049
DATED : August 6, 1996
INVENTOR(S) : Delman R. Hogen, James R. Robin It is certified that error appears in the above—identified patent and that said Letters Patent is hereby corrected as shown below:

Col. 1, line -, delete "PCT/US93/106,455" and insert -- PCT/US93/06455 --.

Signed and Sealed this

Nineteenth Day of November, 1996

Attest:

BRUCE LEHMAN

*Attesting Officer*   *Commissioner of Patents and Trademarks*